(12) United States Patent
Torney

(10) Patent No.: US 9,021,389 B1
(45) Date of Patent: Apr. 28, 2015

(54) SYSTEMS AND METHODS FOR END-USER INITIATED DATA-LOSS-PREVENTION CONTENT ANALYSIS

(75) Inventor: Milind Torney, Viman Nagar (IN)

(73) Assignee: Symantec Corporation, Mountain View, CA (US)

( * ) Notice: Subject to any disclaimer, the term of this patent is extended or adjusted under 35 U.S.C. 154(b) by 1113 days.

(21) Appl. No.: 12/558,930

(22) Filed: Sep. 14, 2009

(51) Int. Cl.
G06F 3/048 (2013.01)
G06F 7/04 (2006.01)
G06F 21/60 (2013.01)

(52) U.S. Cl.
CPC .................................... G06F 21/60 (2013.01)

(58) Field of Classification Search
CPC ...................................................... G06F 3/048
USPC .......................................................... 715/808
See application file for complete search history.

(56) References Cited

U.S. PATENT DOCUMENTS

| | | | | | |
|---|---|---|---|---|---|
| 6,047,300 | A | * | 4/2000 | Walfish et al. | 715/257 |
| 6,347,296 | B1 | * | 2/2002 | Friedland | 704/231 |
| 6,459,440 | B1 | * | 10/2002 | Monnes et al. | 715/808 |
| 6,795,856 | B1 | * | 9/2004 | Bunch | 709/224 |
| 2005/0027723 | A1 | * | 2/2005 | Jones et al. | 707/100 |
| 2005/0283726 | A1 | * | 12/2005 | Lunati | 715/533 |
| 2006/0075228 | A1 | * | 4/2006 | Black et al. | 713/167 |

OTHER PUBLICATIONS

IronPort AsyncOS 6.0 User Guide, May 4, 2009, http://www.cisco.com/en/US/docs/security/wsa/wsa6.0/user_guide/WSA_6.0.0_GA_User_Guide.pdf, pp. 213-236.*

McAfee VirusScan Enterprise 8.7i Product Guide, 2008, http://www.uchastings.edu/infotech/docs/mcafee-product-guide-pc.pdf, pp. 29, 37, 39, 40.*

Data Loss Prevention; Cisco; accessed on Jul. 17, 2009; http://www.cisco.com/en/US/docs/security/csa/csa60/user_guide/Data_Classification.html#wp1033172.

Proofpoint Introduces Proofpoint on Demand™, Hosted Service for Enterprise-class Email Security and Data Loss Prevention; Proofpoint; Aug. 7, 2009; http://www.proofpoint.com/news-and-events/press-releases/pressdetail.php ?PressReleaseID=166.

BigFix DLP is SC Magazine's "Best Buy"; BigFix, Inc.; Nov. 7, 2009; http://www.marketwire.com/press-release/Bigfix-Inc-789973.html.

Using Management Center for Cisco Security Agents 6.0—Data Loss Prevention; http://www.cisco.com/en/US/docs/security/csa/csa60/user_guide/Data_Classification.html#wp1033172, as accessed on Jul. 14, 2009.

(Continued)

*Primary Examiner* — Namitha Pillai
*Assistant Examiner* — Matthew Ell
(74) *Attorney, Agent, or Firm* — ALG Intellectual Property, LLC

(57) ABSTRACT

A computer-implemented method for end-user initiated data-loss-prevention content analysis may include identifying an end-user application that handles content subject to data-loss-prevention policies. The computer-implemented method may also include receiving a request through a user interface associated with the end-user application to analyze selected content for data-loss-prevention policy compliance. The computer-implemented method may further include performing an analysis of the selected content for data-loss-prevention policy compliance. The computer-implemented method may additionally include providing a result of the analysis through the user interface associated with the end-user application. Various other methods, systems, and computer-readable media are also disclosed.

20 Claims, 6 Drawing Sheets

(56) References Cited

OTHER PUBLICATIONS

Marketwire, Incorporated; Big Fix Ships Data Leak Prevention Update; http://www.marketwire.com/press-release/bigfix-ships-data-leak-prevention-update-789973.htm, as accessed on Jul. 14, 2009.

Proofpoint, Inc.; Live Webinar: BlueCross BlueShield Case Study, Best Practices and Critical Steps to Protect and Secure Sensitive Data; www.proofpoint.com, as accessed on Jul. 14, 2009.

* cited by examiner

SYSTEMS AND METHODS FOR END-USER INITIATED DATA-LOSS-PREVENTION CONTENT ANALYSIS

BACKGROUND

In the electronic information age, people may share, access, and disseminate high volumes of information. The ease of disseminating information electronically is empowering. At the same time, the workforce has become increasingly mobile, and the ubiquity of high-speed Internet access, smart mobile devices, and portable storage means that "the office" may be anywhere. As a consequence, it has become more difficult than ever for organizations to prevent the loss of sensitive data. Organizations are therefore increasingly looking to Data Loss Prevention ("DLP") solutions to protect their sensitive data.

Traditional DLP systems may employ a variety of heuristics and intercept data at a variety of points in a computing system in efforts to detect and regulate the flow of sensitive data. Unfortunately, heuristics may sometimes fail to detect sensitive data (e.g. if the data is encrypted), and traditional DLP systems may simply fail to intercept data in motion at certain points in a system. Ultimately, it may be impractical to completely eliminate false negatives from heuristic methods, and it may also be difficult to completely eliminate leak points from DLP systems. However, the vast majority of data loss incidents are unintentional. Accordingly, the instant disclosure addresses a need for systems and methods that help end users to avoid violating data-loss-prevention policies in the first place.

SUMMARY

As will be described in greater detail below, the instant disclosure generally relates to systems and methods for end-user initiated data-loss-prevention content analysis. Embodiments of the present disclosure may enable an end user to analyze content for data-loss-prevention policy compliance through a user interface of an end-user application that handles the content. For example, a method for end-user initiated data-loss-prevention content analysis may include identifying an end-user application that handles content subject to data-loss-prevention policies, receiving a request through a user interface associated with the end-user application to analyze selected content for data-loss-prevention policy compliance, performing an analysis of the selected content for data-loss-prevention policy compliance, and providing a result of the analysis through the user interface associated with the end-user application.

In some embodiments, receiving the request through a user interface associated with the end-user application to analyze selected content for data-loss-prevention policy compliance includes receiving a request generated by: 1) generating the selected content and/or 2) modifying the selected content. According to certain embodiments, receiving the request through a user interface associated with the end-user application to analyze selected content for data-loss-prevention policy compliance includes receiving a request generated by selecting the selected content. Additionally or alternatively, receiving the request through a user interface associated with the end-user application to analyze selected content for data-loss-prevention policy compliance may include receiving a request generated by: 1) clicking a button, 2) issuing a keyboard command, 3) issuing a command through a user-interface device, and/or 4) a user-initiated command discrete from selecting the selected content, from modifying the selected content, and from generating the selected content.

In various embodiments, receiving the request through a user interface associated with the end-user application to analyze selected content for data-loss-prevention policy compliance includes receiving a request to analyze selected content. In certain embodiments, receiving the request through a user interface associated with the end-user application to analyze selected content for data-loss-prevention policy compliance includes receiving a request to analyze a selected file. In some embodiments, receiving the request through a user interface associated with the end-user application to analyze selected content for data-loss-prevention policy compliance includes receiving a request to analyze all content loaded by the end-user application.

According to some embodiments, performing a result of the analysis through the user interface associated with the end-user application includes highlighting content in violation of a data-loss-prevention policy. In certain embodiments, performing a result of the analysis through the user interface associated with the end-user application includes displaying the result of the analysis in a pop-up user interface element. In various embodiments, performing a result of the analysis through the user interface associated with the end-user application includes displaying a portion of the selected content that contributed to a violation of the data-loss-prevention policy and/or providing the reason that the selected content is in violation of the data-loss-prevention policy.

In certain embodiments, identifying an end-user application that handles content subject to data-loss-prevention policies includes identifying an e-mail client, a word processor, a file manager, a web browser, a file transfer application, and/or an instant messenger. In some embodiments, identifying an end-user application that handles content subject to data-loss-prevention policies includes interfacing with the end-user application through a plug-in architecture.

In various embodiments, a system for end-user initiated data-loss-prevention content analysis may include an identification module, a request module, an analysis module, and a disclosure module. The identification module may be programmed to identify an end-user application that handles content subject to data-loss-prevention policies. The request module may be programmed to receive a request through a user interface associated with the end-user application to analyze selected content for data-loss-prevention policy compliance. The analysis module may be programmed to perform an analysis of the selected content for data-loss-prevention policy compliance. The disclosure module may be programmed to provide a result of the analysis through the user interface associated with the end-user application.

In some embodiments, the request module may be programmed to receive the request through the user interface by receiving a request generated by modifying the selected content and/or generating the selected content. According to certain embodiments, the request module may be programmed to receive the request through the user interface by receiving a request generated by selecting the selected content. In various embodiments, the request module may be programmed to receive the request through the user interface by receiving a request generated by selecting a menu item, clicking a button, issuing a keyboard command, issuing a command through a user-interface device, and/or a user-initiated command discrete from selecting the selected content, from modifying the selected content, and from generating the selected content.

According to some embodiments, the request module may be programmed to receive the request to analyze selected content by receiving a request to analyze highlighted content.

In various embodiments, the request module may be programmed to receive the request to analyze selected content by receiving a request to analyze a selected file. In certain embodiments, the request module may be programmed to receive the request to analyze selected content by receiving a request to analyze all content currently loaded by the end-user application.

In various embodiments, a computer-readable-storage medium may include one or more computer-executable instructions that, when executed by at least one processor of a computing device, cause the computing device to identify an end-user application that handles content subject to data-loss-prevention policies, receive a request through a user interface associated with the end-user application to analyze selected content for data-loss-prevention policy compliance, perform an analysis of the selected content for data-loss-prevention policy compliance, and provide a result of the analysis through the user interface associated with the end-user application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
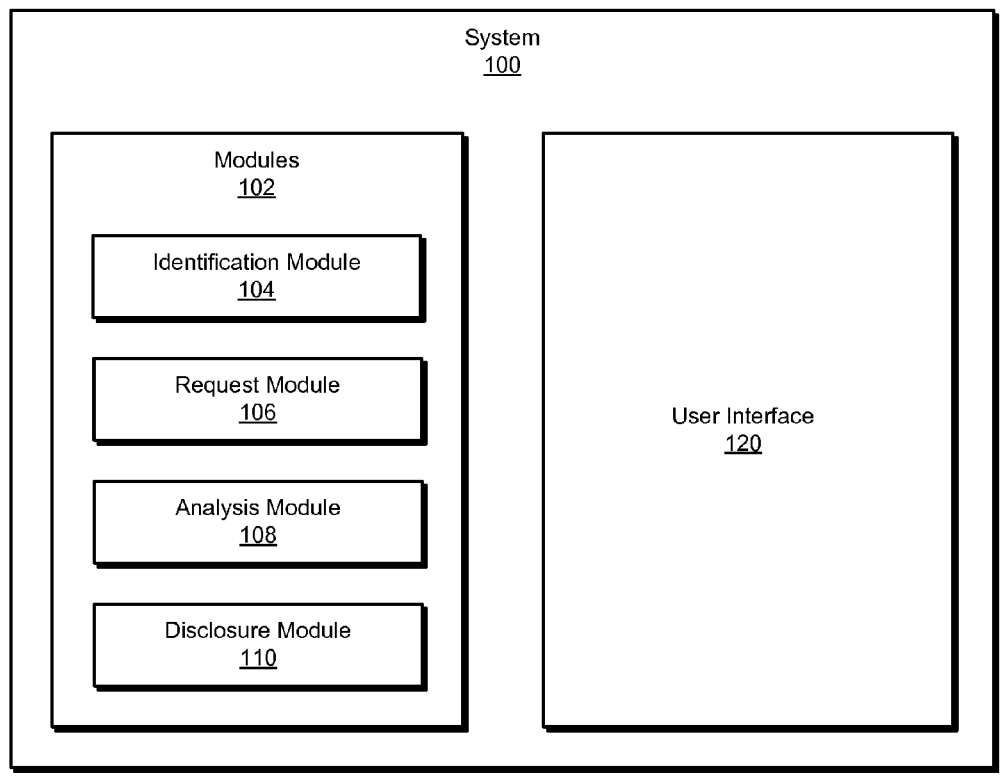
FIG. 1 is a block diagram of an exemplary system for end-user initiated data-loss-prevention content analysis.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for end-user initiated data-loss-prevention content analysis. Embodiments of the instant disclosure may help to prevent data-loss-prevention policy violations by enabling end users to request content analysis so that the end users may learn which content is subject to data-loss-prevention policy violations. This may provide various advantages over traditional DLP systems by better educating end users on DLP policies, thereby potentially reducing the future burden on the DLP system and its administrators and reducing data leaks where the DLP system may fail to intercept or recognize sensitive data. For example, a DLP system may receive a request through a user interface associated with an end-user application to analyze selected content to determine whether the content implicates a data-loss-prevention policy. The DLP system may then analyze the content and provide a result of the analysis through the user interface.

Figure 2:
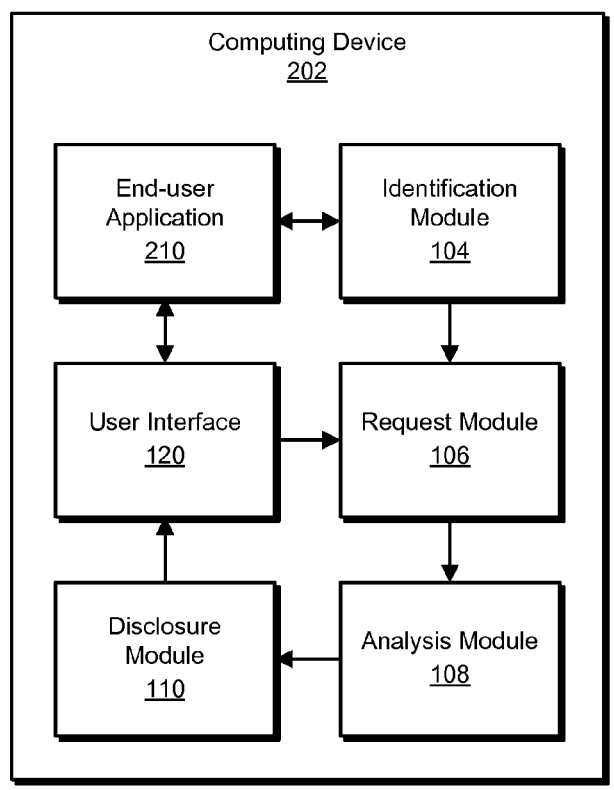
FIG. 2 is a block diagram of an exemplary system for end-user initiated data-loss-prevention content analysis.
Figure 3:
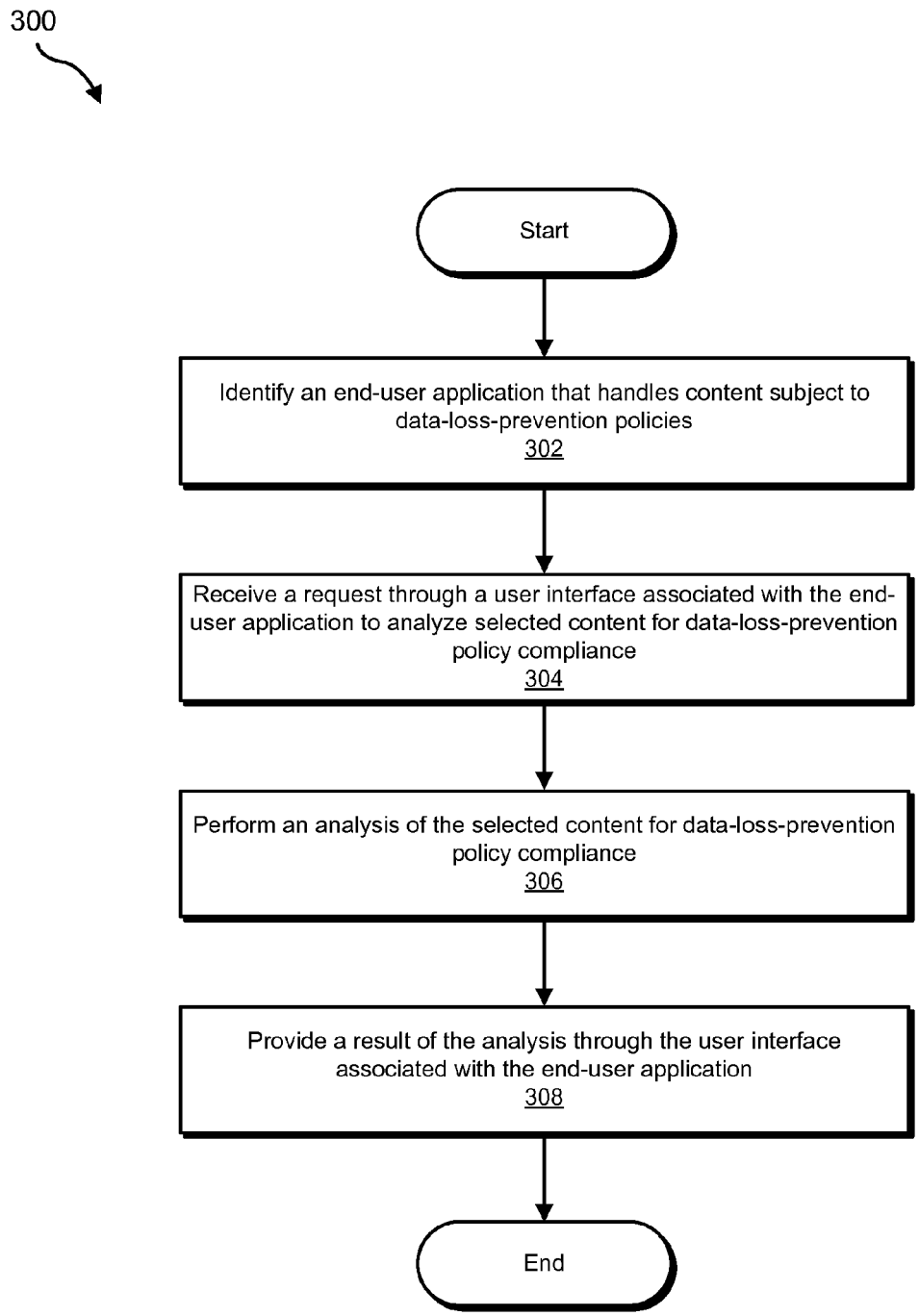
FIG. 3 is a flow diagram of an exemplary method for end-user initiated data-loss-prevention content analysis.
Figure 4:
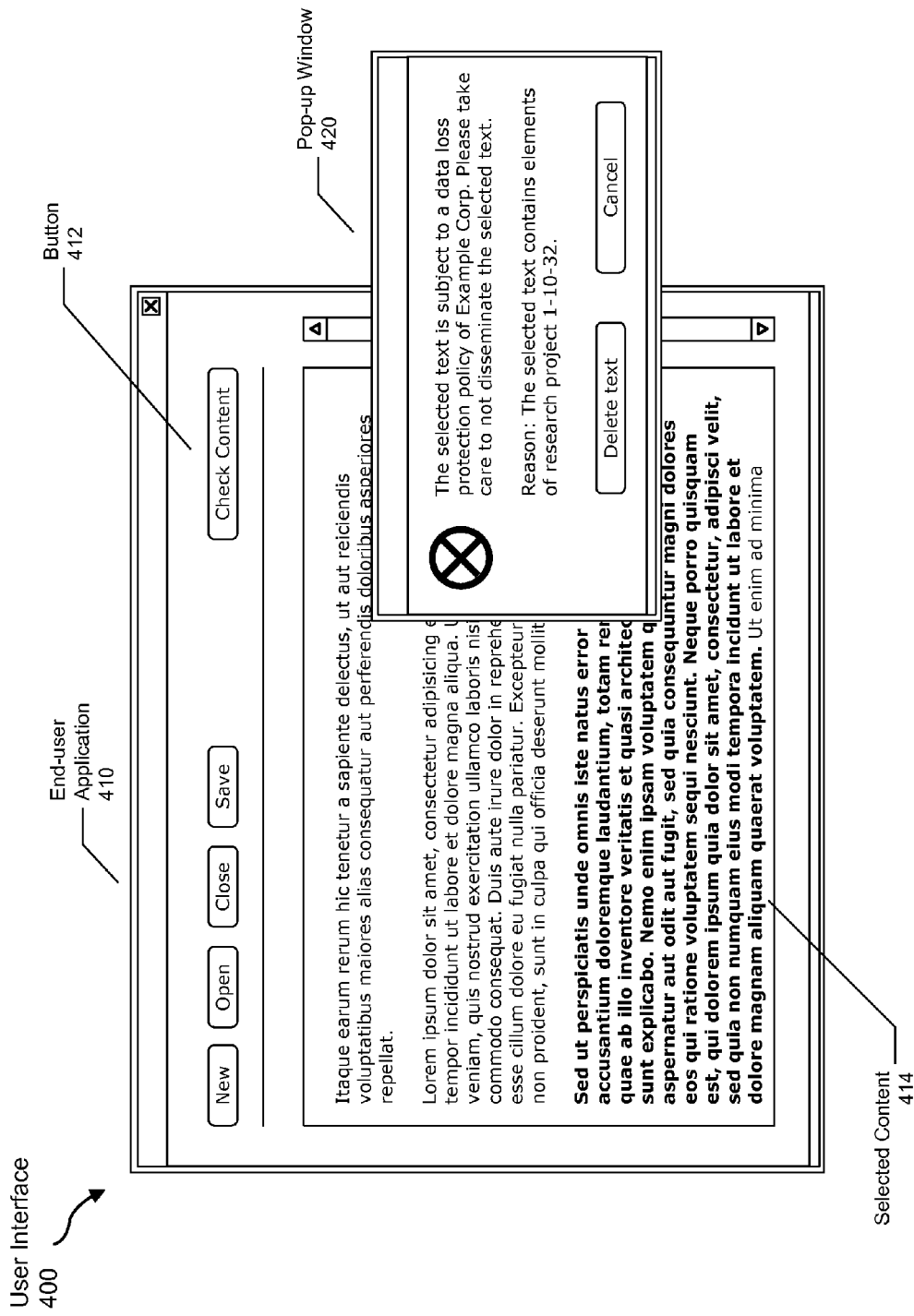
FIG. 4 is an illustration of an exemplary user interface for end-user initiated data-loss-prevention content analysis.
Figure 5:
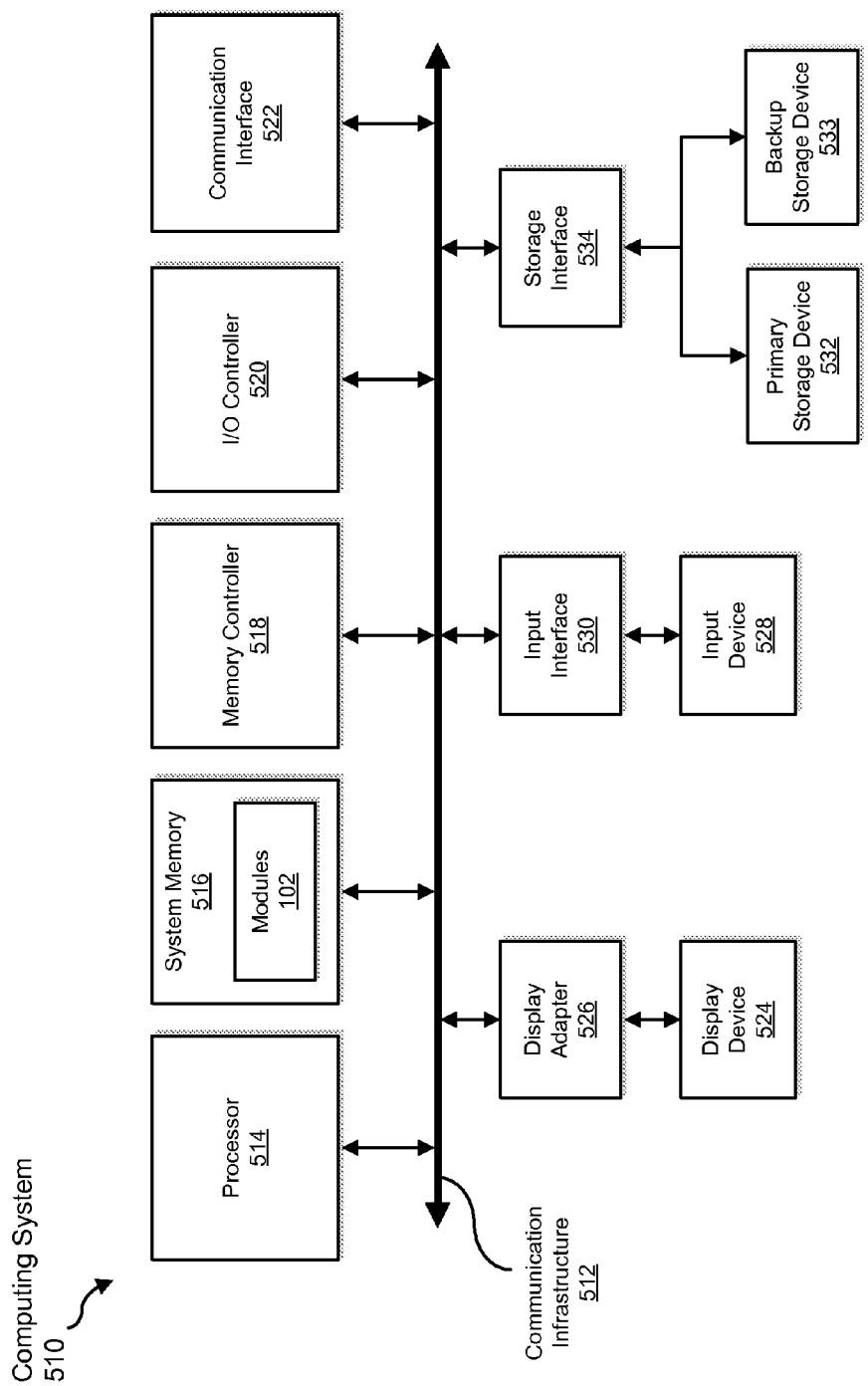
FIG. 5 is a block diagram of an exemplary computing system capable of implementing one or more of the embodiments described and/or illustrated herein.
Figure 6:
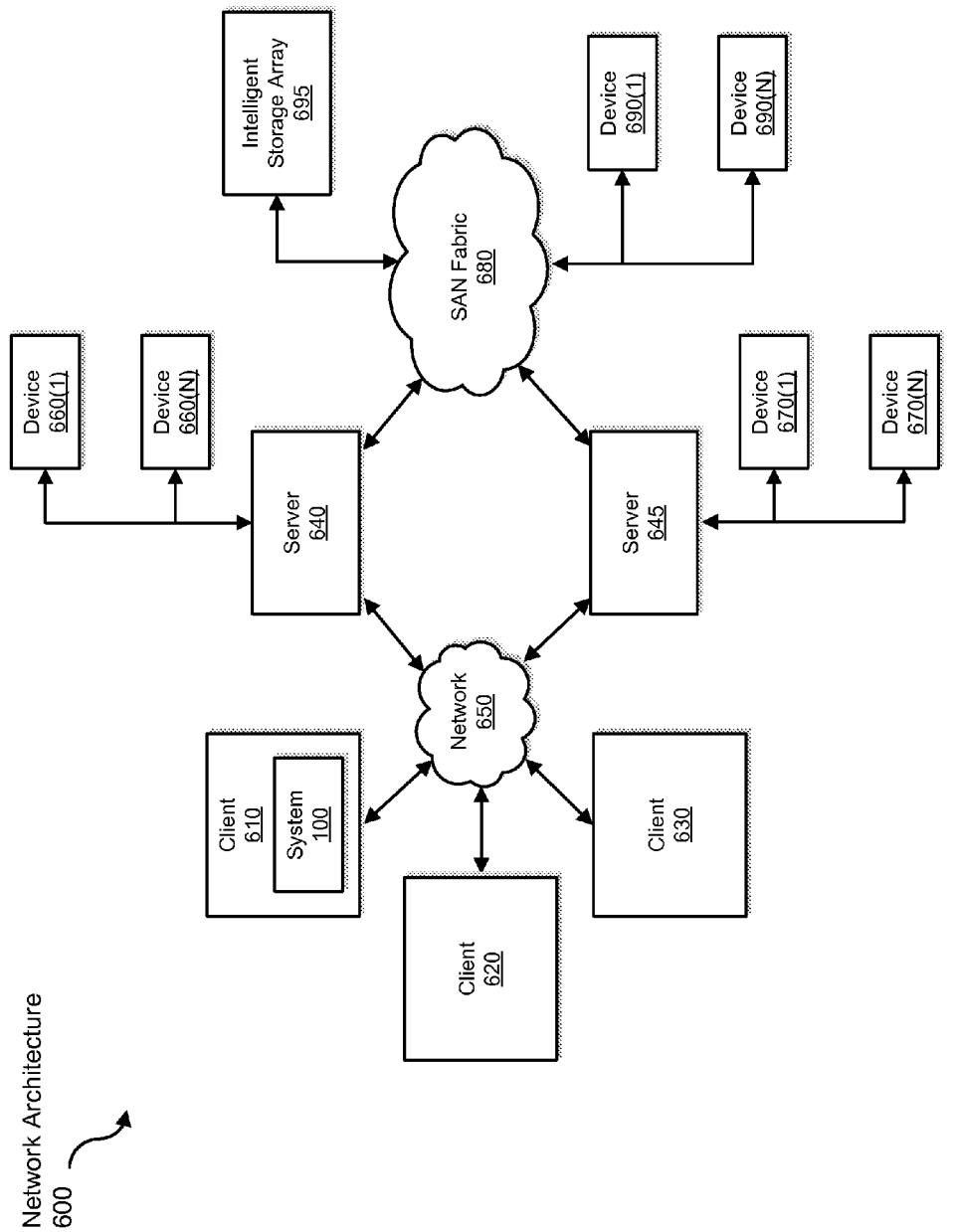
FIG. 6 is a block diagram of an exemplary computing network capable of implementing one or more of the embodiments described and/or illustrated herein.

FIGS. 1-2 show exemplary systems for end-user initiated data-loss-prevention content analysis, and FIG. 3 shows an exemplary method for accomplishing the same. FIG. 4 illustrates an exemplary user interface for end-user initiated data-loss-prevention content analysis. FIGS. 5 and 6 illustrate an exemplary computing system and network architecture for implementing embodiments of the instant disclosure.

FIG. 1 is a block diagram of an exemplary system 100 for end-user initiated data-loss-prevention content analysis. As illustrated in this figure, exemplary system 100 may include one or more modules 102 for performing one or more tasks. For example, and as will be explained in greater detail below, exemplary system 100 may include an identification module 104 programmed to identify an end-user application that handles content subject to data-loss-prevention policies. Exemplary system 100 may also include a request module 106 programmed to receive a request through a user interface (such as a user interface 120) associated with the end-user application to analyze selected content for data-loss-prevention policy compliance.

In addition, and as will be described in greater detail below, exemplary system 100 may include an analysis module 108 programmed to perform an analysis of the selected content for data-loss-prevention policy compliance. Exemplary system 100 may further include a disclosure module 110 programmed to provide a result of the analysis through the user interface associated with the end-user application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment.

As shown in FIG. 2, system 200 may include a computing device 202. In one embodiment, and as will be described in greater detail below, computing device 202 may be programmed to receive requests through user interface 120 to analyze content handled by an end-user application 210 and to provide a result of the analysis (e.g., whether the content implicates a data-loss-prevention policy) through user interface 120.

For example, identification module 104 may identify end-user application 210, which may handle content subject to data-loss-prevention policies. Receiving module 106 may then receive a request through user interface 120, which may be associated with end-user application 210, to analyze selected content for data-loss-prevention policy compliance. Analysis module 108 may then perform an analysis of the selected content for data-loss-prevention policy compliance. Disclosure module 110 may then provide a result of the analysis through user interface 120.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

FIG. 3 is a flow diagram of an exemplary computer-implemented method 300 for end-user initiated data-loss-prevention content analysis. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. For example, at step 302 identification module 104 may, as part of computing device 202, identify an end-user application that handles content subject to data-loss-prevention policies.

Identification module 104 may identify the end-user application in any suitable manner. For example, identification module 104 may identify the end-user application by monitoring a process list. In another example, identification module 104 may identify the end-user application by interfacing with the end-user application through a plug-in architecture. As used herein, the term "plug-in" may refer to any plug-in, extension, add-on, module, library, or other component which may interface with an application to extend the capabilities of the application and/or modify its functions.

Identification module 104 may identify any suitable end-user application. For example, identification module 104 may identify an e-mail client, a word processor, a file manager, a web browser, a file transfer application, and/or an instant messenger. Generally, identification module 104 may identify any end-user application that handles content subject to data-loss-prevention policies. As used herein, an application "handling" content may refer to the application loading the content, presenting the content, manipulating the content, moving the content, copying the content, transforming the content, and/or otherwise acting on the content. For example, an e-mail client may handle content subject to data-loss-prevention policies by allowing an end-user to draft an e-mail message and/or by identifying file attachments to send.

At step 304 request module 106 may receive a request through a user interface associated with the end-user application to analyze selected content for data-loss-prevention policy compliance. Request module 106 may receive a request generated in a variety of ways. For example, request module 106 may receive a request triggered when content is modified or selected. For example, if an end user is composing a document in a word processor, when the end user adds to the document or modifies the document request module 106 may receive a request to analyze content (such as a sentence, paragraph, page, section, and/or document) containing the addition or modification. In some examples, request module 106 may automatically receive such requests. Additionally or alternatively, request module 106 may only receive requests generated in such a manner when a feature to analyze content in real-time is enabled (e.g., an end user may check a box labeled "allow real-time data-loss-prevention analysis").

Request module 106 may also receive requests generated by selecting the selected content. For example, request module 106 may receive a request generated by highlighting a passage of text, selecting a file, and/or loading a file. In some examples, request module 106 may automatically receive such requests. Additionally or alternatively, request module 106 may only receive requests generated in such a manner when a feature to automatically analyze selected content is enabled (e.g., an end user may check a box labeled "automatically analyze selected content").

In various examples, request module 106 may receive requests generated by end-user interactions with the user interface. For example, request module 106 may receive a request to analyze the selected content generated by clicking a button (e.g., an end user may click a button labeled "classify the content"), issuing a keyboard command (e.g., a pre-configured keyboard chord may trigger a request to analyze the selected content), and/or issuing a command through any suitable user-interface device (e.g., with a voice command via a microphone, with gestures via a mouse or a camera, etc.). In some examples, request module 106 may receive a request generated by a user-initiated command discrete from selecting, modifying, or generating the selected content (e.g., any request explicitly initiated by a end-user initiated command rather than a request automatically generated in real-time as an implicit component of another action taken by the end-user).

Request module 106 may receive a request to analyze a variety of selected content. For example, request module 106 may receive a request to analyze highlighted content, such as text highlighted in a word processing document. In another example, request module 106 may receive a request to analyze a selected file. For example, an end user may select a file in a file transfer application and click "analyze this file" before choosing to transfer the file. In an additional example, request module 106 may receive a request to analyze all content currently loaded by the end-user application. As used herein, "selected content" may refer to any content explicitly or implicitly selected for analysis.

As used herein, a user interface being "associated" with an end-user application generally refers to any interface that receives a request to analyze content that is handled by the end-user application. Such a user interface may be provided and/or displayed by the end user-application. Alternatively, such a user interface may be provided and/or displayed by a module distinct from the end-user-application (e.g., a data loss prevention system module, a plug-in for the end-user application, etc.). For example, a user interface of an end-user application may be associated with the end-user application. Additionally or alternatively, a user interface of a plug-in of an end-user application may be associated with the end-user application. In some embodiments, a user interface that discloses the results of an analysis performed on content handled by an end-user application may be associated with the end-user application. For example, a user interface of a data-loss-protection system that analyzes content handled by an end-user application may be associated with the end-user application. In some cases, the "user interface" may refer to a single interface system. Additionally or alternatively, the "user interface" may refer to multiple interface systems used in conjunction to provide for end-user initiated data-loss-prevention content analysis.

Returning to FIG. 3, at step 306 analysis module 108 may perform an analysis of the selected content for data-loss-prevention policy compliance. Analysis module 108 may perform the analysis in any suitable manner. For example, analysis module 108 may pipe the selected content to a predetermined DLP analysis engine. As used herein, the phrase "data-loss-prevention policy" may refer to a policy and/or rule that describes, defines, or otherwise identifies content that an organization desires to protect. A data-loss-prevention policy may be configured in a variety of formats or configurations. For example, a data-loss-prevention policy may include signatures, such as hashes, of sensitive data. Additionally or alternatively, a data-loss-prevention policy may include the sensitive data itself. In some embodiments, a data-loss-prevention policy may include one or more entries in a database or list. For example, each row of customer data in a customer data list may comprise a data-loss-prevention policy. As another example, each product-pricing entry in a product database may comprise a data-loss-prevention policy. Alternatively, a single data-loss-prevention rule may include a set of database entries or other data entries.

A data-loss-prevention policy may apply to the content of one or more files. As used herein, the phrase "file" may refer to any form or type of data entity or digital information. For example, files may include data files, executable files, file segments or other portions of files, database entries, one or more segments of executable code, financial information, customer information, pricing information, product design information, trade-secret information, confidential information, privileged information and/or any other file or information.

In addition to identifying content of a file, a data-loss-prevention policy may also identify other attributes of the file. For example, a data-loss-prevention policy may identify a file name, a file creation date, a file modification date, a location where the file is stored, a size of the file, and/or any other attribute of the file. A data-loss-prevention policy may additionally or alternatively identify other contextual information associated with a file. For example, a data-loss-prevention policy may identify to whom a file is being sent, from whom a file is being sent, a destination location of a file, and/or any other contextual information associated with a file.

Analysis module 108 may analyze selected content from a variety of contexts. For example, analysis module 108 may analyze content from WINDOWS EXPLORER in order to validate files before they may be printed or copied to removable drives. In another example, analysis module 108 may analyze content from MICROSOFT OUTLOOK in order to validate the content of an e-mail. In an additional example, analysis module 108 may analyze content from INTERNET EXPLORER or FIREFOX in order to validate HTTP content before it may be sent.

At step 308 disclosure module 110 may provide a result of the analysis through the user interface associated with the end-user application. Disclosure module 110 may provide the result of the analysis in a variety of contexts. For example, disclosure module 110 may highlight content in violation of a data-loss-prevention policy. Additionally or alternatively, disclosure module 110 may display the result of the analysis in a pop-up user interface element (such as a pop-up window or a pop-up notification). In other examples, disclosure module 110 may provide the result of the analysis through a variety of output devices, such as by making an audible signal through a sound device.

Disclosure module 110 may provide a variety of information in the result of the analysis. For example, disclosure module 110 may display a portion of the selected content that contributed to a violation of the data-loss-prevention policy (e.g., content could contribute to a potential violation if transmitted, printed, etc.). For example, disclosure module 110 may display a string of text that, in analysis, matched a hash for sensitive data. In another example of information that disclosure module 110 may provide, disclosure module 110 may provide the reason that the selected content is in violation of the data loss prevention policy (e.g., transmitting, printing, and/or disseminating the selected content could violate a data loss prevention policy). For example, disclosure module 110 may display a rule and/or code that corresponds to the selected content. Additionally or alternatively, disclosure module 110 may access relevant organizational materials that explain, in natural language, a data-loss-prevention policy corresponding to the selected content.

In some embodiments, disclosure module 110 may present a level of information based on predetermined organizational requirements or policies. For example, disclosure module 110 may present more detailed information to an end-user that belongs to a predetermined class of trusted users, advanced users, and/or administrators. Additionally or alternatively, disclosure module 110 may present different information and/or different levels of detail in different stages of end-user training (e.g., disclosure module 110 may present more information in early training stages). In some embodiments, disclosure module 110 may also present an option to receive more detailed information or to send a request to an administrator to explain the results of an analysis.

As an example and for illustrative purposes only, FIG. 4 shows an exemplary user interface 400. As shown in FIG. 4, user interface 400 may include an end-user application 410 and a pop-up window 420. End-user application 410 may include a button 412 and some selected content 414.

In this exemplary illustration, end-user application 410 may be a word processor. An end-user may have some concern about a passage of text in the document, uncertain of whether it includes sensitive data under a data-loss-prevention policy. Accordingly, the end-user may select the selected content 414 and press button 412.

Button 412 may be provided to end-user application 410 as part of a DLP plug-in. Accordingly, identification module 104 may identify end-user application 410, which handles content subject to data-loss-prevention policies. When the end-user presses button 412, request module 106 may receive a request through user interface 400 to analyze selected content 414 against data-loss-prevention policies. Analysis module 108 may then analyze selected content 414. In this manner, the end user may conveniently and efficiently learn more about relevant data-loss-prevention policies in the same environment in which he is working with the potentially sensitive data.

After analysis module 108 analyzes selected content 414, disclosure module 110 may provide a result of the analysis through user interface 400. In this example, disclosure module 110 may provide the result of the analysis through pop-up window 420. Pop-up window 420 may advise the end user that the selected text does in fact contain sensitive data that should not be disseminated, and may further refer the end user to a sensitive project that corresponds to the sensitive data contained in selected text 414. Pop-up window 420 may further provide the end user with a remediation option, such as to delete selected text 414.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, receiving, performing, providing, interfacing, generating, modifying, clicking, issuing, highlighting, displaying, and/or providing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as identifying, receiving, performing, providing, interfacing, generating, modifying, clicking, issuing, highlighting, displaying, and/or providing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, receiving, performing, providing, interfacing, generating, modifying, clicking, issuing, highlighting, displaying, and/or providing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, receiving, performing, providing, interfacing, generating, modifying, clicking, issuing, highlighting, displaying, and/or providing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, receiving, performing, providing, interfacing, generating, modifying, clicking, issuing, highlighting, displaying, and/or providing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, receiving, performing, providing, interfacing, generating, modifying, clicking, issuing, highlighting, displaying, and/or providing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, receiving, performing, providing, interfacing, generating, modifying, clicking, issuing, highlighting, displaying, and/or providing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for end-user initiated data-loss-prevention content analysis.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a display device into a device configured to educate end users about data-loss-prevention policies.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for end-user initiated data-loss-prevention content analysis, at least a portion of the method being performed by a computing device comprising at least one processor, the method comprising:

identifying an end-user application that handles content subject to data-loss-prevention policies;

identifying a user's selection of content within the end-user application, the selected content being selected by the user for data-loss-prevention analysis;

receiving a request from the user through a user interface associated with the end-user application to analyze the selected content for data-loss-prevention policy compliance;

in response to the request from the user and before the user transfers the selected content, performing an analysis of the selected content for data-loss-prevention policy compliance;

determining that the user belongs to a class of users;

providing a result of the analysis through the user interface associated with the end-user application, wherein providing the result of the analysis comprises:

providing, based on the user belonging to the class of users, more detailed information than would be provided to another user who does not belong to the class of users;

displaying a reason that a portion of the selected content is potentially in violation of the data-loss-prevention policy, the reason identifying a rule or code of the data-loss-prevention policy that is potentially violated by the portion of the selected content;

providing the user with an option to delete the portion of the selected content that contributed to the potential violation before the user transfers the selected content.

2. The computer-implemented method of claim 1, wherein receiving the request from the user through the user interface comprises receiving a request generated by at least one of:
  generating the selected content;
  modifying the selected content.

3. The computer-implemented method of claim 1, wherein the class of users comprises advanced users.

4. The computer-implemented method of claim 1, wherein receiving the request from the user through the user interface comprises receiving a request generated by the user issuing a command through a user-interface device that requests analysis of the selected content.

5. The computer-implemented method of claim 1, wherein receiving the request from the user to analyze the selected content comprises receiving a request to analyze highlighted content.

6. The computer-implemented method of claim 1, wherein receiving the request from the user to analyze the selected content comprises receiving a request to analyze a selected file.

7. The computer-implemented method of claim 1, wherein receiving the request from the user to analyze the selected content comprises receiving a request to analyze all content currently loaded by the end-user application.

8. The computer-implemented method of claim 1, wherein providing the result of the analysis comprises highlighting content in violation of the data-loss-prevention policy.

9. The computer-implemented method of claim 1, wherein the class of users comprises administrators.

10. The computer-implemented method of claim 1, wherein providing the result of the analysis comprises at least one of:
  displaying the portion of the selected content that contributed to the potential violation of the data-loss-prevention policy;
  displaying an additional reason that the portion of the selected content is potentially in violation of the data-loss-prevention policy, the additional reason being that the portion of the selected content includes text that corresponds to a sensitive project.

11. The computer-implemented method of claim 1, wherein identifying the end-user application that handles content subject to data-loss-prevention policies comprises identifying at least one of:
  an e-mail client;
  a word processor;
  a file manager;
  a web browser;
  a file transfer application;
  an instant messenger.

12. The computer-implemented method of claim 1, wherein identifying the end-user application that handles content subject to data-loss-prevention policies comprises interfacing with the end-user application through a plug-in architecture.

13. A system for end-user initiated data-loss-prevention content analysis, the system comprising:
  an identification module, stored in memory, that identifies an end-user application that handles content subject to data-loss-prevention policies and to identify a user's selection of content within the end-user application, the selected content being selected by the user for data-loss-prevention analysis;
  a request module, stored in memory, that receives a request from the user through a user interface associated with the end-user application to analyze the selected content for data-loss-prevention policy compliance;
  an analysis module, stored in memory, that:
    in response to the request from the user and before the user transfers the selected content, performs an analysis of the selected content for data-loss-prevention policy compliance, and
    determines that the user belongs to a class of users;
  a disclosure module, stored in memory, that:
    provides a result of the analysis through the user interface associated with the end-user application by:
      providing, based on the user belonging to the class of users, more detailed information than would be provided to another user who does not belong to the class of users;
      displaying a reason that a portion of the selected content is potentially in violation of the data-loss-prevention policy, the reason identifying a rule or code of the data-loss-prevention policy that is potentially violated by the portion of the selected content;
    provides the user with an option to delete the portion of the selected content that contributed to a potential violation before the user transfers the selected content;
  one or more processors that execute the identification module, the request module, the analysis module, and the disclosure module.

14. The system of claim 13, wherein the request module further receives the request from the user through the user interface by receiving a request generated by at least one of:
  generating the selected content;
  modifying the selected content.

15. The system of claim 13, wherein the request module further receives the request from the user through the user interface by receiving a request generated by selecting the selected content.

16. The system of claim 13, wherein the request module further receives the request from the user through the user interface by receiving a request generated by the user clicking a button presented in the user interface, the button indicating that the selected content will be analyzed for data-loss-prevention policy compliance.

17. The system of claim 13, wherein the class of users comprises trusted users.

18. The system of claim 13, wherein the request module further receives the request from the user to analyze the selected content by receiving a request to analyze a selected file.

19. The system of claim 13, wherein the request module further receives the request from the user to analyze the selected content by receiving a request to analyze all content currently loaded by the end-user application.

20. A non-transitory computer-readable-storage medium comprising one or more computer-executable instructions that, when executed by at least one processor of a computing device, cause the computing device to:
  identify an end-user application that handles content subject to data-loss-prevention policies;
  identify a user's selection of content within the end-user application, the selected content being selected by the user for data-loss-prevention analysis;
  receive a request from the user through a user interface associated with the end-user application to analyze the selected content for data-loss-prevention policy compliance;

in response to the request from the user and before the user transfers the selected content, perform an analysis of the selected content for data-loss-prevention policy compliance;
determine that the user belongs to a class of users;
provide a result of the analysis through the user interface associated with the end-user application, wherein providing the result of the analysis comprises:
 providing, based on the user belonging to the class of users, more detailed information than would be provided to another user who does not belong to the class of users;
 displaying a reason that a portion of the selected content is potentially in violation of the data-loss-prevention policy, the reason identifying a rule or code of the data-loss-prevention policy that is potentially violated by the portion of the selected content;
provide the user with an option to delete the portion of the selected content that contributed to the potential violation before the user transfers the selected content.

* * * * *